Patented Mar. 11, 1952

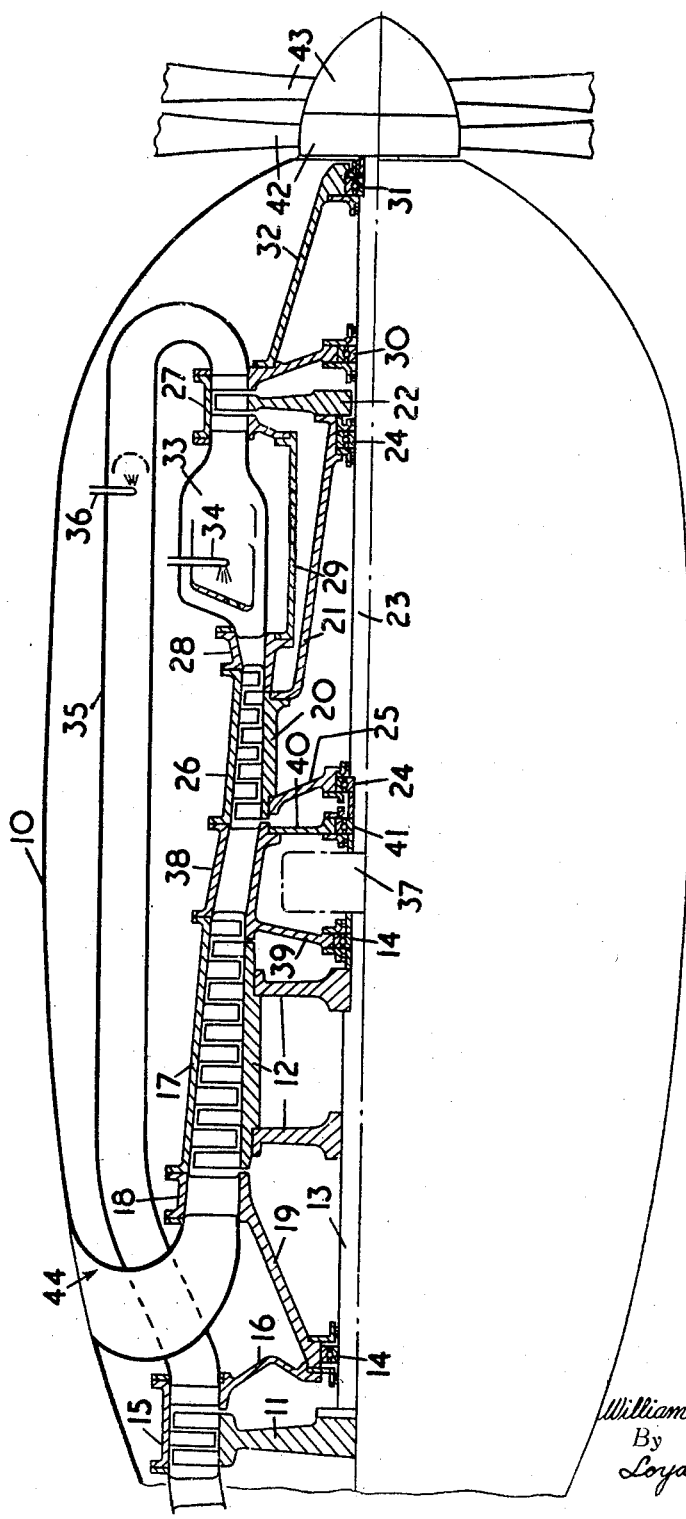

2,589,078

UNITED STATES PATENT OFFICE 2,589,078

AIRCRAFT PROPULSION POWER PLANT

William Rede Hawthorne, Silver Spring, Md., assignor to Power Jets (Research and Development) Ltd., London, England, a British company Application March 27, 1945, Serial No. 585,167
In Great Britain March 29, 1944

2 Claims. (Cl. 60—39.17)

This invention relates to internal combustion turbine power plants of the type, referred to herein as double compound, having two mechanically independent rotors capable of running at different speeds, each of which consists of a compressor assembled as a single rotary unit with a turbine, and ducting interconnecting said rotors so that air passes successively and in the order named through the low and high pressure compressors, combustion means in which fuel is injected and burnt continuously, and the high and low pressure turbines in which the gaseous products of combustion are expanded so as to cause them to drive their respective compressors.

The references herein to engines "of the type referred to" is to be read as meaning an engine having the characteristics described in the foregoing, and as including modifications thereof in which the useful power, and in certain arrangements the efficiency also, is increased materially by employing reheating, which consists in injecting and burning additional fuel in the gaseous combustion produtcs at a point or points between adjacent turbines or turbine stages; or in which power is also taken from a separate power turbine driven by the expanding gases. The most efficient and flexible operation of an engine of the type referred to is obtained where the high pressure turbine drives the high pressure compressor and the low pressure compressor is driven by the low pressure turbine.

It is an object of the invention to adapt an engine of the type referred to for use as an aircraft propulsion unit driving a tractor propeller, that is, a bladed propulsion means which is at the leading end of the unit, considered in relation to the direction of flight. It is desirable in such a case that the propeller should be driven from the low pressure turbine in order to keep as low as possible the reduction ratio of any gearing between these elements. Difficulty arises, however, in the case of a tractor propeller, particularly if an axial flow turbine is employed, in achieving this desirable end whilst at the same time attaining the degree of compactness demanded of an aircraft power unit and satisfying the further requirements that the low pressure turbine should drive the low pressure compressor and must exhaust in a downstream direction, without introducing undesirable complication into the ducting. All these difficulties are met in the present invention by adopting an arrangement in which the high pressure turbine, which drives the high pressure compressor, and the low pressure turbine, which drives the low pressure compressor, are located at opposite ends of the engine with the low pressure turbine placed at the rear or downstream end, and by driving the tractor propeller from the low pressure turbine by a power shaft which extends axially through the high pressure rotor.

Generally speaking, a reduction gear will be necessary in the propeller drive in order to produce an acceptable revolution speed of the propeller, depending on the characteristics of the latter. Where the general design is such that critical whirling speeds of the propeller shaft do not arise, the reduction gear may be placed in front of the high pressure rotor. According to a further feature of the invention, however, such reduction gear, or some stage thereof, is disposed between the low and high pressure rotors. By so placing the reduction gearing or some part of it, it becomes possible to ensure that the propeller driving shaft will run at such a speed that critical whirling speeds in this shaft, which would otherwise arise, are avoided.

This arrangement, although having the disadvantage of requiring a hollow high pressure rotor to accommodate the power transmission shaft for the tractor propeller, enables a power drive suitable for the latter to be taken from the low pressure rotor without necessitating a reversal of flow of the gases after passing through the low pressure turbine, which reversal of flow would entail such a pressure drop as would have a considerable adverse effect on the efficiency of the engine. Also the arrangement enables the shafting between the low pressure turbine and low pressure compressor to be kept short so that the danger of whirling speeds being reached is reduced considerably.

The invention is more particularly described with reference to the accompanying drawing which is a half radial section and half side elevation of a double compound engine for use as an aircraft propulsion unit driving a tractor propeller.

In the embodiment illustrated in the drawing the double compound engine comprises a low pressure axial flow turbine, a low-pressure axial flow compressor, a high pressure axial flow compressor, an annular combustion chamber, and a high pressure axial flow turbine, all arranged coaxially, and in that serial order from rear to front, within an engine nacelle 10.

The low pressure turbine and the low pressure compressor have a common rotor of composite form comprising a bladed turbine wheel 11 and a bladed compressor drum 12 both fixed to an axial shaft 13 which is mounted for rotation in bearings 14. The turbine wheel 11 operates in a bladed turbine stator casing 15 which is supported from the rear bearing 14 by a diaphragm 16, and the compressor drum 12 operates in a bladed stator casing 17 the rear end of which is secured to an inlet duct ring 18 having a rearward conical extension 19 supported by said rear bearing 14.

Similarly, the high pressure turbine and the high pressure compressor have a common rotor of composite form comprising a bladed compressor rotor drum 20 connected by a forward conical extension 21 to a bladed turbine wheel 22, this composite rotor being supported for free rotation about a shaft 23, passing axially therethrough, by bearings 24, the rear bearing 24 supporting the rear end of the rotor drum 20 through a diaphragm 25 and the forward bearing 24 being housed in the apex of the conical extension 21. The rotor drum 20 operates in a bladed stator casing 26, and the turbine wheel 22 operates in a bladed stator casing 27; these stator casings 26, 27 are interconnected by a short duct ring 28 and a cylindrical housing 29 which encloses the conical extension 21 of the rotor drum 20, the stator casing 27 being supported upon the shaft 23 by a bearing 30 immediately in advance of the turbine wheel 22 and by a further bearing 31 in the apex of a forward conical extension 32 secured to said stator casing 27.

An annular combustion chamber 33, into which fuel is injected and burned continuously by burner jets 34 (only one of which is shown), connects the duct ring 28 to the inlet of the high pressure turbine casing 27, and the high pressure turbine outlet is connected through pipe ducting 35 to the inlet of the low pressure turbine casing 15, said ducting 35 extending through the nacelle 10 and being fitted with a reheater jet 36 for injecting and burning fuel in the gas stream between the turbines.

Between the compressor portions of the two mechanically independent rotors is located a reduction gear 37 which is driven by the shaft 13 of the low pressure rotor and drives the shaft 23 which extends forwardly and axially through the high pressure rotor, said reduction gear being mounted within a duct ring 38 which connects the flow annuli of the two compressors and is supported at its rear end by the forward bearing 14 and integral disc 39 and at its forward end by a diaphragm 40 and bearing 41 on the shaft 23. This shaft 23 drives the contra-rotating elements 42, 43 of a tractor propeller located in advance of the engine nacelle 10.

In operation, air is drawn into the engine, from the boundary layer passing over the nacelle 10, through radial and forwardly directed inlet ducts 44 (only one of which is shown) leading to the duct ring 18, said air passing through the low and high pressure compressors in series to the combustion chamber 33. The gaseous products of combustion from the chamber 33 are partially expanded through the high pressure turbine so as to drive the high pressure turbine compressor rotor (20, 21, 22, 25), and then is reheated in the pipe ducting 35 before being expanded through the low pressure turbine so as to drive the low pressure turbine compressor rotor (11, 12, 13) and, through the reduction gear 37 and shaft 23, the tractor propeller 42, 43.

Any residual energy in the exhaust gases from the low pressure turbine may be used, in known manner, as a propulsion jet.

This application is related to my co-pending application Serial No. 558,024, filed October 10, 1944, now patent No. 2,504,414 in that it also relates to double compound internal combustion turbines.

What I claim as my invention and desire to secure by Letters Patent is:

1. In a double compound internal combustion turbine aero engine including a rotor comprising a low pressure compressor and a low pressure turbine and a rotor comprising a high pressure compressor and a high pressure turbine, said rotors being independently rotatable and coaxially adjacent so that the low pressure turbine, low pressure compressor, high pressure compressor and high pressure turbine are in that serial order from the rear to the front of the engine (considered in relation to the direction of flight), the air entry being at the rear end of the low pressure compressor and the low pressure turbine exhausting rearwardly without terminal reversal of flow, combustion means annularly disposed between the high pressure compressor and the high pressure turbine, ducting interconnecting said compressors, turbines and combustion means, said ducting being disposed annularly about the common axis of the rotors and so constructed and arranged as to provide a generally axial flow path through the low and high pressure compressors, combustion means and high and low pressure turbines in that order with reversal of the general direction of flow between the turbines, the improvement that comprises reduction gearing located between adjacent ends of the two rotors and driven by the low pressure rotor, a power transmission shaft driven by said reduction gear and extending axially through the high pressure rotor to the front of the engine and a tractor propeller driven by said power transmission shaft.

2. In an aircraft propulsion plant of the double compound gas turbine type which includes a high-pressure turbine, high-pressure and low-pressure compressors, and a low pressure turbine all in axial alignment along the intended direction of flight, a combustion chamber and ducting defining a path from the compressors to the combustion chamber and from the combustion chamber to the turbines, the low-pressure turbine being in the rear end and the compressors being between the turbines, the improvement that comprises a tractor propeller at the front end of the plant and shaft extending rearwardly from the propeller along the plant axis, a shaft extending forwardly from the low-pressure turbine along the same axis, and reduction gearing constituting a driving connection from said turbine shaft to said propeller shaft, said gearing being located along the plant axis intermediate the remote axial extremities of the compressors.

WILLIAM REDE HAWTHORNE.

REFERENCES CITED

The following references are of record in the file of this patent:

UNITED STATES PATENTS

| Number | Name | Date |
| --- | --- | --- |
| 1,959,795 | Lysholm | May 22, 1934 |
| 2,050,349 | Lysholm et al. | Aug. 11, 1936 |
| 2,243,467 | Jendrassik | May 27, 1941 |
| 2,292,288 | Pescara | Aug. 4, 1942 |
| 2,326,072 | Seippel | Aug. 3, 1943 |
| 2,409,446 | Pavlecka | Oct. 15, 1946 |
| 2,411,227 | Planiol et al. | Nov. 19, 1946 |
| 2,454,738 | Hawthorne | Nov. 23, 1948 |
| 2,504,414 | Hawthorne | Apr. 18, 1950 |